US008502661B2

(12) United States Patent
Mauro et al.

(10) Patent No.: US 8,502,661 B2

(45) Date of Patent: Aug. 6, 2013

(54) CONTAINER TRACKING

(75) Inventors: Marco Mauro, Turin (IT); Stefano Cosenza, Turin (IT); Paolo Capano, Turin (IT)

(73) Assignee: C.R.F. Societá Consortile per Azioni, Orbassano (IT)

(*) Notice: Subject to any disclaimer, the term of this patent is extended or adjusted under 35 U.S.C. 154(b) by 745 days.

(21) Appl. No.: 12/712,892

(22) Filed: Feb. 25, 2010

(65) Prior Publication Data

US 2010/0214092 A1 Aug. 26, 2010

(30) Foreign Application Priority Data

Feb. 25, 2009 (EP) .................................... 09425075

(51) Int. Cl.
*G08B 1/08* (2006.01)
*H04W 4/00* (2009.01)

(52) U.S. Cl.
USPC ................ 340/539.3; 340/539.1; 340/539.11; 455/422.1; 455/427

(58) Field of Classification Search
None
See application file for complete search history.

(56) References Cited

U.S. PATENT DOCUMENTS

| | | | | |
|---|---|---|---|---|
| 5,887,176 | A * | 3/1999 | Griffith et al. | 713/320 |
| 6,995,667 | B2 * | 2/2006 | He et al. | 340/539.13 |
| 8,068,023 | B2 * | 11/2011 | Dulin et al. | 340/539.13 |
| 2006/0001525 | A1 | 1/2006 | Nitzan et al. | |
| 2006/0181413 | A1 | 8/2006 | Mostov | |
| 2008/0186163 | A1 * | 8/2008 | Mills | 340/539.13 |
| 2008/0186166 | A1 * | 8/2008 | Zhou et al. | 340/539.13 |
| 2009/0102653 | A1 * | 4/2009 | McGinnis et al. | 340/551 |
| 2009/0102660 | A1 * | 4/2009 | Evans et al. | 340/572.1 |
| 2010/0214092 | A1 * | 8/2010 | Mauro et al. | 340/539.1 |
| 2011/0260869 | A1 * | 10/2011 | Gagnon et al. | 340/572.1 |

OTHER PUBLICATIONS

English Translation of Office action dated Sep. 4, 2012 for JP 2010-039365, 3 pages.

* cited by examiner

*Primary Examiner* — Julie Lieu
(74) *Attorney, Agent, or Firm* — Klarquist Sparkman, LLP

(57) ABSTRACT

A container tracking system comprising a mobile unit configured to be coupled to a container to be tracked and to communicate with a remote control unit through of a communication system. The mobile unit comprising a positioning module, an alarm module adapted to detect alarm conditions related to said container, and a communication module generating a tracking signal containing positioning data of the mobile unit and/or alarm information associated with one or more alarm conditions related to the container. Furthermore, the mobile unit is configured to evolve to a temporary deactivation state whenever a communication unavailability condition of the tracking signal through the communication system occurs.

18 Claims, 8 Drawing Sheets

| Code | Payload type |
|---|---|
| 0000 | Mobile unit calibration reconfiguration |
| 0001 | Mobile unit configuration value request |
| 0010 | Request for sending SMS sequence stored on mobile unit |
| 0011 | Spare |
| 0100 | Spare |
| 0101 | Spare |
| 0110 | Spare |
| 0111 | Spare |
| 1000 | Spare |
| 1001 | Spare |
| 1010 | Spare |
| 1011 | Spare |
| 1100 | Spare |
| 1101 | Mobile unit position |
| 1110 | Alarm from mobile unit |
| 1111 | Calibration sending from mobile uinit |

FIG. 5

| Field | Size [bit] | Description |
|---|---|---|
| First SMS | 8 | Lower SMS number |
| Last SMS | 8 | Higher SMS number |

FIG. 7

| Field | Dimensions [bit] | Description |
|---|---|---|
| Variable 1 | 128 | Ground control unit telephone number |
| Variable 2 | 8 | Maximum GSM network waiting time in confirmed arming state<br>Resolution: 1 min/bit |
| Variable 3 | 8 | SMS reception waiting time by the ground control unit in first transmission state<br>Resolution: 1 min/bit |
| Variable 4 | 1 | GPS on flag in Sleep state<br>(0 = off, 1 = on) |
| Variable 5 | 1 | Temperature reading-enabled flag<br>(0 = no sensor, 1 = sensor present) |
| Variable 6 | 16 | Temperature alarm threshold<br>Resolution: 0.005 degrees centigrade/bit |
| Variable 7 | 16 | Lower hysteresis on temperature alarm threshold<br>Resolution: 0.005 degrees centigrade/bit |
| Variable 8 | 8 | Trigger interval for transition from sleep state to event management state<br>Resolution: 0.5 h/bit |
| Variable 9 | 8 | Trigger multiplier for transition from event management state to coverage detection state<br>Resolution: integer/bit |
| Variable 10 | 8 | Maximum GSM network waiting time in coverage detection state<br>Resolution: 1 min/bit |
| Variable 11 | 8 | SMS reception waiting time by grounf control unit in transmission state<br>Resolution: 1 min/bit |
| Variable 12 | ... | ... |
| Variable N | ... | ... |

FIG. 6

| Field | Dimensions [bit] | Description |
|---|---|---|
| Year | 6 | Numerical value of last two digits of year |
| Month | 4 | Numerical value of the digits of month |
| Day | 5 | Numerical value of the digits of day |
| Minutes | 11 | Number of minutes of day |
| Latitude | 22 | Latitude in the following format:<br>(accuracy about 11 meters)<br>Lat:= Lat_gps*10000+1800000;<br>Full scale = not available value |
| Longitude | 22 | Longitude in the following format :<br>(accuracy about 11 meters)<br>Long:=Long_gps*10000+1800000;<br>Full scale = not available value |
| Battery voltage | 8 | 255 possible values (possible offset to be defined)<br>Full scale = not available value |
| Door sensor voltage | 8 | 255 possible values (possible offset to be defined)<br>Full scale = not available value |
| Temperature | 8 | 255 possible values (possible offset to be defined)<br>Full scale = not available value |
| Button state | 1 | 0 open<br>1 closed |

FIG. 8

| Field | Dimensions [bit] | Description |
|---|---|---|
| Mobile unit position payload | | |
| Provider | 192 | Telephone provider's name or code<br>NULL = unavailable information |
| Micro-cell | 192 | Cellular network micro-cell code<br>NULL = unavailable information |
| Code | 4 | Alarm type code |
| Progressive | 8 | Progressive number of transmitted alarms |

FIG. 9

| Alarm type | Alarm code |
|---|---|
| Mobile unit disengagement | 0000 |
| Doors open | 0001 |
| Doors closed | 0010 |
| Wire cut | 0011 |
| Abnormal doors open signal value | 0100 |
| Temperature threshold exceeded | 0101 |
| Internal temperature back under threshold | 0110 |

FIG. 10

| Field | Description | Initialization value |
|---|---|---|
| Variable 1 | Ground control unit telephone number | |
| Variable 2 | Maximum GSM network waiting time in confirmed arming state | 3 minutes |
| Variable 3 | SMS reception waiting time by the ground control unit in first transmission state | 3 minutes |
| Variable 4 | GPS on flag in Sleep state | 0 |
| Variable 5 | Temperature reading-enabled flag | 0 |
| Variable 6 | Temperature alarm threshold | 5 degrees |
| Variable 7 | Lower hysteresis on temperature alarm threshold | 2 degrees |
| Variable 8 | Trigger interval for transition from Sleep state to Event Management state | 3 hours |
| Variable 9 | Trigger multiplier for transition from Event Management state to Coverage Detection state | 8 |
| Variable 10 | Maximum GSM network waiting time in Coverage Detection state | 2 minutes |
| Variable 11 | SMS reception waiting time by ground control unit in Transmission state | 4 minutes |

FIG. 11

| Value | ASCII | Value | ASCII | Value | ASCII | Value | ASCII |
|---|---|---|---|---|---|---|---|
| 0 | A | 16 | Q | 32 | g | 48 | w |
| 1 | B | 17 | R | 33 | h | 49 | x |
| 2 | C | 18 | S | 34 | i | 50 | y |
| 3 | D | 19 | T | 35 | j | 51 | z |
| 4 | E | 20 | U | 36 | k | 52 | 0 |
| 5 | F | 21 | V | 37 | l | 53 | 1 |
| 6 | G | 22 | W | 38 | m | 54 | 2 |
| 7 | H | 23 | X | 39 | n | 55 | 3 |
| 8 | I | 24 | Y | 40 | o | 56 | 4 |
| 9 | J | 25 | Z | 41 | p | 57 | 5 |
| 10 | K | 26 | a | 42 | q | 58 | 6 |
| 11 | L | 27 | b | 43 | r | 59 | 7 |
| 12 | M | 28 | c | 44 | s | 60 | 8 |
| 13 | N | 29 | d | 45 | t | 61 | 9 |
| 14 | O | 30 | e | 46 | u | 62 | + |
| 15 | P | 31 | f | 47 | v | 63 | / |

FIG. 12

CONTAINER TRACKING

CROSS REFERENCE TO RELATED APPLICATION

This application claims priority from European Patent Application No. 09425075.0 filed on Feb. 25, 2009, which is incorporated by reference in its entirety.

BACKGROUND

The term "container tracking" means the detection and the remote real-time and/or postponed transmission of information related to the container position, in order to be able to determine the route thereof during transport operations and/or its operating state, thus identifying a condition of danger, theft or break-in of the container.

The need to track containers for commercial purposes and/or of safety reasons deriving from possible theft and/or terrorism conditions is known.

For this purpose, electronic surveillance systems comprising satellite positioning apparatuses (such as GPS—Global Positioning System), which are installed on containers or on container transport means, and a remote supervision unit interacting with the satellite positioning apparatuses for continuously determining the position of the transport means, were used.

Furthermore, the above-described satellite positioning apparatuses, when directly installed on containers, are known to be typically powered by electric batteries, because the container does not typically have its own electric supply system.

Therefore, the operating autonomy of the currently known satellite positioning apparatuses is strongly influenced by the depletion time of the electric supply batteries.

This condition is highly penalizing whenever container traceability is required over long lasting transport missions and/or under environmental conditions which limit battery performance, such as, for example, very low environmental temperatures.

The need is therefore felt to optimize the power consumption in systems of the above-described type in order to ensure container traceability for the whole transport time, even in case of long lasting transports.

SUMMARY

It is therefore desirable to implement a container tracking system which meets the above-described needs.

A container tracking system is disclosed comprising a mobile unit configured to be coupled to a container to be tracked and to communicate with a remote control unit through of a communication system. The mobile unit comprises a positioning module, an alarm module adapted to detect alarm conditions related to the container, and a communication module generating a tracking signal containing positioning data of the mobile unit and/or alarm information associated with one or more alarm conditions related to the container. Furthermore, the mobile unit is configured to evolve to a temporary deactivation state whenever a communication unavailability condition of the tracking signal through the communication system occurs.

BRIEF DESCRIPTION OF THE DRAWINGS

The present invention will now be described with reference to the accompanying drawings, which illustrate a non-limitative embodiment thereof, in which:

FIG. 5 shows a possible embodiment in which each message code usable in the SMS signal is associated with a given payload corresponding, for example, to a mobile unit calibration reconfiguration.

FIG. 6 shows the structure of a payload associated with the mobile unit calibration reconfiguration.

FIGS. 7 and 8 show an equal number of structures of a payload related to the request of sending a sequence of SMS signals stored in the sending buffer.

FIGS. 9 and 10 show an equal number of payload structures associated with the mobile unit alarm.

FIG. 11 shows a table containing the initialization values used by the system.

FIG. 12 shows a table related to a positional numbering system using ASCII characters.

DETAILED DESCRIPTION

Figure 1:
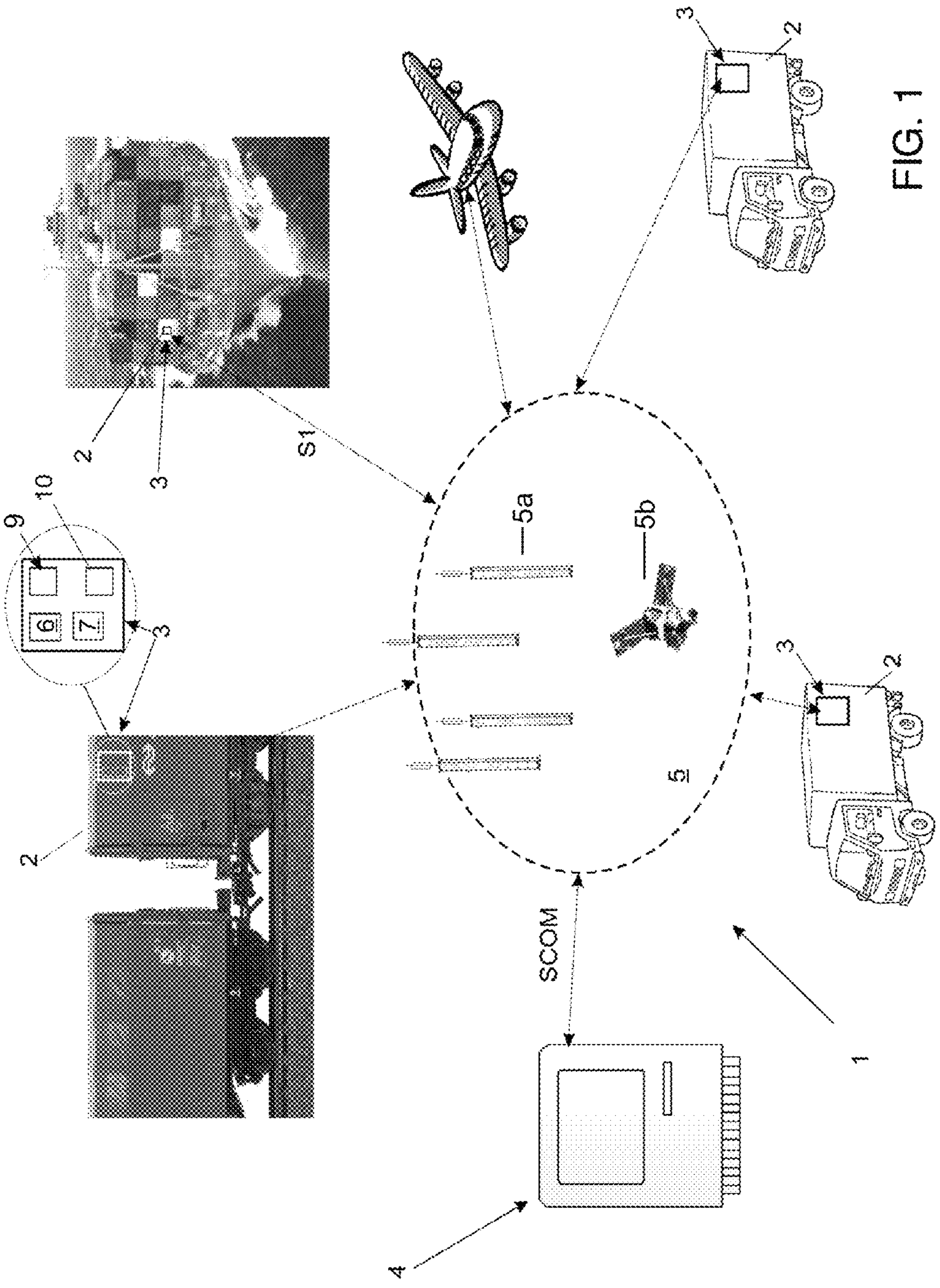
FIG. 1 diagrammatically shows a container tracking system made.

With reference to FIG. 1, numeral 1 indicates as a whole a system adapted to track containers 2, which is provided with mobile units 3 installed on the containers 2, and with a remote ground control unit 4 communicating with the mobile units 3 by means of a communication system 5.

The containers 2 may be transported by any land transport means, such as for example a truck or a train, and/or by ship means.

With reference to FIG. 1, the communication system 5 is configured to receive and transmit communication signals of SMS (Short Message Service) phone type by means of a mobile phone network or line 5*a*, and/or to transmit satellite communication signals by means of a satellite communication system 5*b*.

For purposes of this disclosure, some terms are defined as follows:

The term "arming" of a mobile unit 3 can mean a continuous actuating operations of an arming button, placed on the mobile unit 3, for a predetermined arming time interval DTM, e.g. at least 30 seconds.

The term "message" can mean an informative content exchanged between the remote ground control unit 4 and the mobile unit 3 in both directions; while the term "mission" can mean the set of operations implemented by a mobile unit 3 from an initial moment in which the arming of mobile unit 3 is ascertained and a final moment in which the depletion of the power supplied to the mobile unit 3 by a power supply device occurs, which supply device specifically comprises one or more electric batteries.

The term "mission code" corresponds to a code containing: a code which univocally identifies the mobile unit 3; a code which univocally identifies the container 2 on which mobile unit 3 is installed; and a series of additional information, such as, for example, the sender, the recipient, the container content, the dispatch date, and other important information.

With reference to FIG. 1, system 1 is adapted to manage the communications between the mobile units 3 and the remote ground control unit 4 through the communication system 5 according to the communication coverage availability by the latter within the area in which the container 2 is located and if several telephone networks 5*a* are available, according to the roaming configuration of a SIM (Subscriber's Identity Module) installed in the mobile unit 3.

As will be described in detail below, the mobile units 3 and the remote ground control unit 4 share the encoding of information contained in the SMS's.

Specifically, the remote ground control unit 4 is configured to be constantly active and remain connected to the telephone network 5*a* in order to receive SMS signals.

On the other hand, the mobile units 3 installed on containers 2 are configured so as to advantageously alternate high activity periods, during which the electricity consumption is normal, and "low activity" periods, in which the electricity consumption is reduced in order to save battery energy.

Mobile unit 3 is configured to send the following message types to the remote ground control unit 4: positioning messages and/or alarm messages.

Specifically, as will be described below, mobile unit 3 is adapted to send an alarm message to the remote ground control unit 4 when the mobile unit 3 itself is "covered" by a mobile phone network 5*a*.

Furthermore, mobile unit 3 is adapted to send an alarm message to the remote ground control unit 4 if the message is stored in a buffer of the mobile unit 3 itself. In the latter case, mobile unit 3 sends the message when a first useful sending condition occurs.

In this case, the first useful sending condition occurs when mobile unit 3 is active and covered by a mobile phone network 5*a*, for example, i.e. when it is able to communicate through the latter.

As regards the positioning message, it is generated by the mobile unit 3 on a time basis, i.e. at calibratable intervals, and sent in the form of pools of messages, the size of which is calibratable. Therefore, only one SMS may contain several messages.

If the message size exceeds the maximum size of an SMS, mobile unit 3 repeatedly sends additional SMS's until all the previously stored messages have been sent.

As regards the ground control unit 4, it is configured so as to send two types of messages to each mobile unit 3: a reconfiguration message, containing information related to new values to be assigned to the calibrating variables of mobile unit 3, and a message for requesting the messages stored in the memory of mobile unit 3, for possibly retrieving the messages contained in SMS's which did not reach the ground control unit 4.

The mobile unit 3 is further provided with the arming button and an analogue circuit for acquiring alarm signals related to the container conditions (i.e. door opening, temperature, humidity, etc.).

The univocal identification of mobile unit 3 by the remote control unit 4 is carried out by an IMEI (International Mobile Equipment Identity) code assigned to the GSM communication module 10. The IMEI encoding system is a known standard and therefore will not be described in further detail.

Moreover, mobile unit 3 is configured so as to determine information related to the micro-cell of the mobile phone network 5*a* used during the communication, and clusters the SMS telephone signal sending in order to properly reduce the power consumption by the electric battery supplying the mobile unit 3.

Mobile unit 3 is further configured so as to progressively number and store the SMS telephone signals sent to the remote ground control unit 4, and progressively numbers the "alarm messages" transmitted to the remote ground control unit 4. Furthermore, mobile unit 3 is configured so as to manage the acquisition of control signals generated, for example, by an alarm module 9, which is provided with a series of sensors installed in the container 2 and providing a series of data related to arming button state, temperature inside the container 2, opening/closing state of the doors accessing the internal chamber of the container 2, and/or other similar magnitudes, the variation of which is related to an alarm condition.

Moreover, module unit 3 is provided with a memory 6 and is configured to store the "alarm messages" and the "position messages" therein, whenever they are generated.

Specifically, messages may be preferably but not necessarily stored each time in a list which may be sent to the remote ground control unit 4 in reply to a control/request signal transmitted by the same.

Furthermore, with reference to the example shown in FIG. 1, mobile unit 3 is provided with a GSM communication module 10, containing the SIM smart card and capable of communicating the SMS telephone signals through the mobile phone line 5*a*, and with a GPS satellite positioning module 7, adapted to provide the geographic position of the mobile unit 3.

Moreover, mobile unit 3 is configured so as to check the correctness of the recipient before processing the SMS signal to be transmitted, and is able to calculate: a time trigger St1 for managing the transition from a "low activity state" to an "activation state", described in detail below.

As regards the memory 6, it is properly split into: an area containing information assigned during a step of programming the mobile unit 3 and which may not be edited by the software program implemented by the mobile unit 3 itself; an area containing information assigned during a step of programming the mobile unit 3 and which may be edited by the software program implemented by the mobile unit 3 itself; and an area containing the software program implemented by the mobile unit 3.

The electronic surveillance system 1 provides for a procedure of installing and arming each mobile unit 3 on a corresponding container 2, and a procedure of assigning the mobile unit 3 itself to the corresponding container 2.

In this case, the installing and arming procedure includes an operation of physically coupling the mobile unit 3 to the container 2. Such a coupling operation causes the actuation of the arming button of mobile unit 3, which determines an activation condition of the mobile unit 3 and which preferably, but not necessarily, originates a visual signalling of the activation itself, for example, by lighting a series of LEDs (not shown) on the mobile unit 3 itself.

If the coupling of the mobile unit 3 to the container 2 remains unchanged for a time either equal to or longer than a predetermined arming time interval DTA, mobile unit 3 considers the step of arming concluded and starts a step of registering through which it is identified by the remote ground control unit 4.

Instead, if during the predetermined arming time interval DTA, the mobile unit 3 is uncoupled from the container 2, the arming button returns to the off condition. In this case, mobile unit 3 considers the arming as aborted and returns to a "standby state" waiting for a later arming operation.

As regards the procedure of associating the mobile unit 3 with the container 2, it is provided for by the operator who installs the mobile unit 3 on the container 2 communicating the code of the container 2 on which the mobile unit 3 has been installed to the remote ground control unit 4, through independent communication devices/channels.

If the calibrating variables of mobile unit 3 need to be changed, the remote ground control unit 4 can send a SCOM command SMS containing one or more reconfiguration messages to the mobile unit 3 concerned by the calibration, according to the operating mode described in detail below.

The association procedure further provides for the remote ground control unit 4 being able to confirm the carried out association to the operator through a communication device/channel separate from the mobile unit 3.

Figure 2:
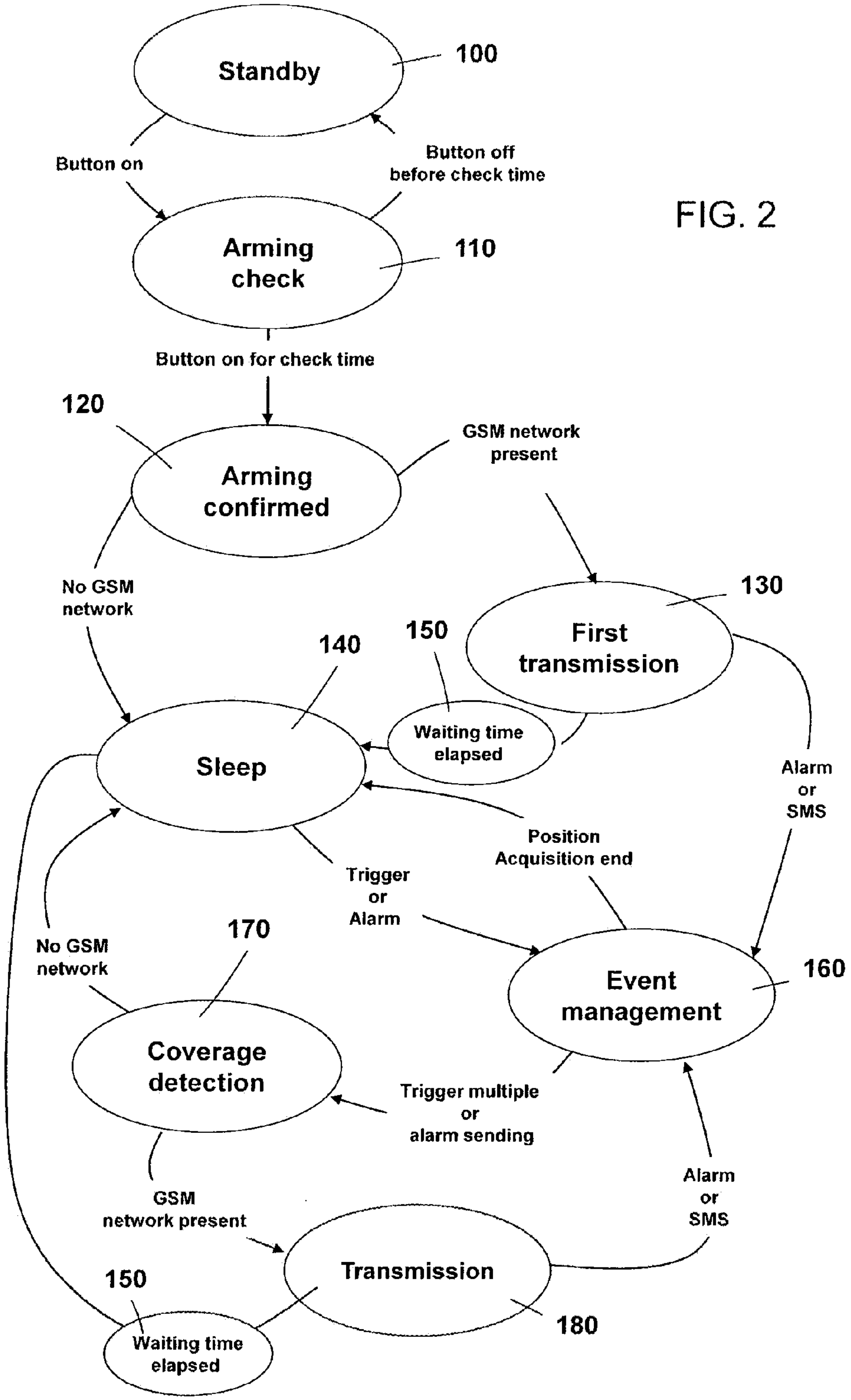
FIG. 2 shows a flow chart indicating the operative states of the system shown in FIG. 1 during the operation thereof.

The state diagram shown in FIG. 2 illustrates the different operating states implemented by the system for tracking the container 2.

Such a procedure provides for the mobile unit 3 evolving to the low activity state, once the arming has been confirmed, from which it exits according to a calibratable time interval for registering the position, and if an alarm is detected.

In this case, the operation of system 1 includes the following states: a "standby state" 100, during which mobile unit 3 is uncoupled from the container 2 and does not interact/communicate with the remote ground control unit 4; an "arming check state" 110, during which mobile unit 3 checks an activation command; a "confirmed arming state" 120, during which mobile unit 3 activates its initialization in order to be able to interact with the remote ground control unit 4 so as to allow it to track the container 2 on which the mobile unit 3 itself is installed.

Upon the "confirmed arming state" 120, system 1 is able to switch to one of the following states according to the operating conditions described in detail below: a "first transmission state" 130; a "low activity state" 140 (shown in FIG. 2 with the term "sleep"); an "activation state" 160 (shown in FIG. 2 with the term "event management"); a "telephone coverage detection state" 170 and a "telephone transmission state" 180.

In detail, the system includes passing from "confirmed arming state" 120 to "first transmission state" 130 when mobile unit 3 detects the presence of the mobile phone line 5*a*.

System 1 passes from "confirmed arming state" 120 to "low activity state" 140, instead, when it detects the absence of the mobile phone line 5*a*.

Furthermore, the system includes passing from "first transmission state" 130 to "low activity state" 140 when, within a predetermined waiting interval DTS, mobile unit 3 detects the absence of the alarm conditions and the absence of SCOM reconfiguration and message request signals transmitted by the remote ground control unit 4. Otherwise, system 1 can pass from "first transmission state" 130 to "activation state" 160.

System 1 further controls a transition from "activation state" 160 to "low activity state" 140, when a wake-up condition associated with the generation of a trigger, and/or a wake-up condition associated with a container alarm condition occurs.

Specifically, in the "low activity state", mobile unit 3 generates a trigger St1 at each predetermined wake-up time interval DT1 and is provided with an internal counter capable of counting the number Nst1 of generated trigger St1.

Furthermore, the system includes passing from "activation state" 160 to "telephone coverage detection state" 170 when a container alarm condition occurs or when a telephone signal saturation condition S1 occurs. The saturation condition is associated with a maximum containing state of position/alarm messages in the telephone signal S1, i.e. in the SMS, and is determined by system 1 when the number Nst1 of triggers has a value equal to a calibrating saturation threshold ST.

System 1 further controls a transition from "coverage detection state" 170 to "low activity state" 140 when reception and transmission unavailability of the tracking telephone signal S1 through the mobile phone line 5*a* occurs.

Furthermore, system 1 controls a transition from "coverage detection state" 170 to "transmission state" 180 when there is the possibility of carrying out the reception and transmission of SMS signals through the mobile phone line 5*a*.

System 1 further controls a transition from "transmission state" 180 to "activation state" 160 either when detecting a container alarm condition or when mobile unit 3 receives a SCOM signal transmitted by the remote ground control unit 4 and containing a reconfiguration or request command for stored messages, within the predetermined waiting interval DTS.

Moreover, system 1 controls a transition from "transmission state" 180 to "low activity state" 140 either when mobile unit 3 does not detect any container alarm condition or when it does not receive any SCOM telephone signal containing a reconfiguration or request for stored messages transmitted by the remote ground control unit 4, within the predetermined waiting interval DTS.

More in detail, with reference to FIG. 2, "standby state" 100 occurs, for example, when the mobile unit 3 is supplied from the production line to the storage warehouse and from there to the operator. Mobile unit 3 starts its mission when the operator installs the mobile unit 3 on the container 2 intended to be supervised by the remote ground control unit 4.

The condition of actuating the arming button may be checked when the button is pressed, while on the contrary the condition of deactivating the same occurs when the arming button is released.

Instead, as regards the "arming check state" 110, it includes determining whether the arming button passes from the actuating condition to the deactivating condition within a certain time interval DTM or not.

If system 1 detects the condition of actuating the arming button for a time longer than the arming interval DTM, mobile unit 3 passes from "arming check state" 110 to "arming confirmed state" 120.

On the other hand, if in "arming check state" 110 mobile unit 3 is uncoupled from the container 2, the deactivation of the arming button occurs.

If such a condition occurs during the predetermined arming interval DTM, system 1 can interrupt the arming and can return to the previous "standby state" 100. If, instead, such a condition occurs after the arming confirmation, then an alarm which determines the system passing to "activation state" 160 is generated.

In "confirmed arming state" 120, system 1 implements the following operations: initializing the GSM communication module 10; initializing the GPS satellite positioning module 7; and initializing a time counter, which is structured to start a time count from the initial moment in which the system goes to the "low activity state" 140 in order to generate a trigger St1 when the measured time interval reaches a value equal to the wake-up time interval DT1.

Furthermore, in "confirmed arming state" 120, mobile unit 3 acquires sensor values associated with the alarm conditions of the container 2 through the alarm module 9; determines the position of mobile unit 3 through the GPS satellite positioning module 7; generates first data related to the measured position and encodes it in a position message; and queues the position message into a buffer.

If the mobile phone network 5*a* is available for receiving and transmitting SMS signals, system 1 passes from "confirmed arming state" 120 to a "first transmission state" 130, in which mobile unit 3 transmits the position message and the possible alarm messages previously stored in the sending buffer to the remote ground control unit 4 through the mobile phone line 5.

Upon the transmission of the position message, system 1 goes to a "first transmission state" 130 in which mobile unit 3 is waiting, for the predetermined interval DTS, for receiving a command telephone signal from the remote ground control unit 4 and/or a container alarm condition.

If mobile unit 3 does not detect any container alarm condition within the predetermined waiting interval DTS and does not receive any SCOM command signal from the remote ground control unit 4, system 1 passes from "first transmission state" 130 to "low activity state" 140.

Instead, if mobile unit 3 receives a SCOM command signal from the remote ground control unit 4 and/or detects an alarm condition within the predetermined waiting interval DTS, system 1 evolves from "first transmission state" 130 to "activation state" 160.

In "low activity state" 140, system 1 checks whether the GSM communication module 10 is on and, if so, it switches it off. This condition may be determined by checking a bit flag stored in an internal registry.

In other words, during this step, system 1 switches the GPS module and the GSM module 10 off in order to reduce supply battery consumption.

In "low activity state" 140, system 1 checks for the presence of not yet sent alarm messages in the sending buffer. In the presence of unsent alarm messages, system 1 provides for decrementing the saturation threshold ST by one unit.

In "low activity state" 140, system 1 can detect the generation of a trigger St1 by the time counter instant-by-instant.

If trigger St1 is detected, mobile unit 3 can evolve to "activation state" 160.

Furthermore, in "low activity state" 140, system 1 checks for the presence of an alarm condition instant-by-instant and, if yes, passes to "activation state" 160.

More in detail, in "activation state" 160, system 1 performs the following operations: switching the GPS module 10 on and acquiring the position; acquiring possible values from external sensors connected to the mobile unit; preparing and storing the position message; determining the sensor values associated with the possible container alarm conditions through the alarm module 9; preparing and storing the possible alarm message.

Specifically, if the transit to "activation state" 160 was caused by a trigger St1 generated during the "low activity state" 140, system 1 can generate a "position message" containing the position of mobile unit 3 indeed, and can queue it into the sending buffer. Under this condition, system 1 checks for the number of triggers NSt1 reaching the saturation threshold ST or not.

The saturation condition is achieved when the messages queued in the sending buffer have reached the maximum predetermined size for transmitting a tracking telephone signal S1, according to the SMS encoding. If ST=NSt1, system 1 can evolve to "coverage detection state", in which the possibility of transmitting the SMS containing the "position messages" to the remote ground control unit 4 is checked.

If the transit to "activation state" was caused by the detection of an alarm condition, system 1 can then generate an "alarm message" and can queue it into the sending buffer. In this case, the system can immediately evolve to "coverage detection state" 170, in which the possibility of transmitting the SMS to the remote ground station 4 is checked.

Instead, if the transit to "activation state" was caused by the reception of a SCOM reconfiguration or request command signal transmitted from the remote ground control unit 4, system 1 can check the coherence of the SCOM command signal, and can run the SCOM command signal.

If the SCOM command contains a recalibration message, mobile unit 3 can update the calibrating variables and then can evolve to "low activity state" 140.

If the SCOM command contains a request for stored message, mobile unit 3 can prepare an SMS containing the required messages and can evolve to "coverage detection state" 170.

In detail, the SMS-encoded SCOM command signal may contain: a reconfiguration of the calibrations of mobile unit 3; or a request for sending the SMS signal(s) stored in the buffer of mobile unit 3.

Specifically, if an SMS-type SCOM command signal containing a calibration reconfiguration is received, mobile unit 3 can store the received calibration values and can use them in the above-described procedure; while, if an SMS sequence sending request is received, the mobile unit can send the required SMS's.

As regards the "coverage detection state" 170, it provides for system 1 preparing the SMS in the sending buffer, and checking for the availability of the reception and transmission of tracking telephone signal S1 in the form of SMS through the mobile phone line 5.

If the reception and transmission is available, system 1 can go to "transmission state" 180. On the other hand, if the reception and transmission is unavailable, system 1 can check for the presence/absence of unsent alarm messages.

If there are unsent alarm messages, system 1 decrements the saturation threshold ST and evolves to "low activity state" 140.

Instead, if there are no unsent alarms messages in the sending buffer upon the detection of the transmission unavailability condition, the system can evolve to "low activity state" 140.

As regards the "transmission state" 180, it provides for the mobile unit 3 sending the SMS(s) related to the tracking telephone signal(s) S1 containing the messages contained in the sending buffer. It is worth noting that in this state, mobile unit 3 may include pooling the previously unsent alarm and/or position messages. In this state, system 1 can go to "standby state" 150 upon the transmission of the SMS-encoded tracking telephone signal(s) S1.

The "first transmission state" 130 provides for mobile unit 3 evolving to "activation state" 160 when, in the predetermined waiting interval DTS, SCOM command signals are received and/or there is at least one alarm condition.

Furthermore, "first activation state" 130 provides for mobile unit 3 evolving to "low activity state" 140 when there is no SMS signal reception and no alarm conditions are detected during the predetermined waiting interval DTS.

For example, the container alarm conditions detectable by mobile unit 3 through the alarm module 9 may be the following: a disengagement alarm of mobile unit 3 from the container 2; and/or an alarm of door opening of the container 2; and/or a temperature alarm.

In this case, system 1 may detect a disengagement alarm of mobile unit 3 by monitoring the state of the arming button once the arming has been confirmed. If the arming button is actuated, the mobile unit is correctly placed on the container 2, while if the arming button is released, a disengagement of mobile unit 3 from the container 2 is detected.

Furthermore, system 1 may detect the door opening alarm by measuring the voltage of a surveillance signal generated by a piezoelectric sensor installed in the container 2. In this case: an open door container condition is detected if the voltage of the surveillance signal is zero; a state of closed doors of container 2 is detected if the voltage of the surveillance signal has a value within the range of a predetermined value higher than zero; a condition of cutting a sensor wire is detected if the voltage of the surveillance signal has a value within the range of a second predetermined value; a fault and/or a possible break-in attempt to the container is detected if the voltage of the surveillance signal has a third value different from the first and second values.

Instead, as regards the temperature alarm, it may provide for the alarm module 9 being equipped with a temperature sensor placed inside the container 2. In this case, a first temperature alarm may be identified when a calibration threshold is exceeded. Furthermore, the alarm module 9 may be able to identify the conditions of auxiliary temperature alarm when the temperature measured inside the container 2 drops below a threshold and/or hysteresis value; and/or when the temperature raises over the threshold value.

Figure 4:
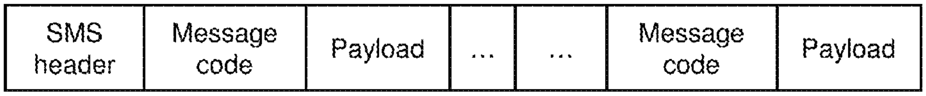
FIG. 4 shows the configuration of a header.

With reference to FIG. 1, in order to reduce the number of transmissions, the position and/or alarm messages generated by system 1 are aggregated in sequence in the sending buffer of the mobile unit up to the saturation of the maximum size of characters of a single SMS. Each single SMS is structured so as to contain a header and a message sequence (message code+payload) as shown in FIG. 4.

In detail, the operations implemented by system 1 during the preparation of an SMS exchanged between remote ground control unit 4 and mobile unit 3 in both directions are the following: generating the message to be sent (message code +payload); possibly concatenating the messages to be sent into a string (header +message code+payload+message code+payload+ . . . ); encrypting the string; Base-64 encoding; inserting into the sending buffer; transmitting; receiving; Base-64 decoding; decoding encryption; reading the single messages contained in the received string.

As regards the header contained in the SMS signal, it may be structured so as to contain the following information, for example: a progressive number 1 byte long, updateable according to the sender's logic, in a range between 1 and 256; a sender ID being 16 bytes long and corresponding to the IMEI code, if the sender corresponds to the mobile unit 3, or alternatively to an alphanumeric string identifying the control unit, if the sender of the SMS signal corresponds to the remote ground control unit 4; and finally a length field having a 1 byte size indicating the number of characters contained in the SMS header included.

As regards the message code, it may consist of a 4-bit string which identifies the payload structure.

The table shown in FIG. 5 is a possible embodiment in which each message code usable in the SMS signal is associated with a given payload corresponding, for example, to a calibration reconfiguration of the mobile unit; a request for sending a sequence of SMS's stored on the mobile unit; a position of mobile unit 3; and an alarm from mobile unit 3 and a calibration sending by the mobile unit.

As regards the payload associated with the calibration reconfiguration of mobile unit 3, it may be structured on the basis of the table shown in FIG. 6.

The payload related to the request of sending SMS signal sequence stored in the sending buffer of mobile unit 3 may be organized as shown in the table illustrated in FIG. 7.

As regards the payload associated with the position of mobile unit 3, instead it may be structured as shown in the table illustrated in FIG. 8.

Moreover, as regards the payload associated with the alarm of mobile unit 3, it may be structured according to the tables shown in FIGS. 9 and 10.

Finally, as regards the initialization values used by system 1, they may correspond by way of example to the values shown in the table illustrated in FIG. 11.

As regards to the content of an SMS signal, system 1 may encrypt it and encode it according to Base-64 encoding.

Specifically, the exchanged information is based on numerical- and alphanumeric-type data. In order to compact this information and minimizing the number of SMS's, the binary data are encoded using a Base-64 encoding. Binary data are assembled as a bit stream. A Base-64 encoding is a positional numbering system which uses 64 symbols. The 64 chosen symbols are 64 ASCII characters and the bit stream is split into 6-bit pools.

The possible values are encoded according to the following table shown in FIG. 12.

In this case, the number of Base-64 characters may be obtained with the this formula:

$$NR\_CHAR=ROUND.UP(NR\_BIT/6;4)$$

where NR_BIT is the number of bits in the binary stream, and ROUND.UP is a known function which rounds up to the next integer which is a multiple of 4.

For example, 16 Base-64 characters are required to encode a 96-bit stream; 20 characters are required to encode a 110-bit stream.

Figure 3:
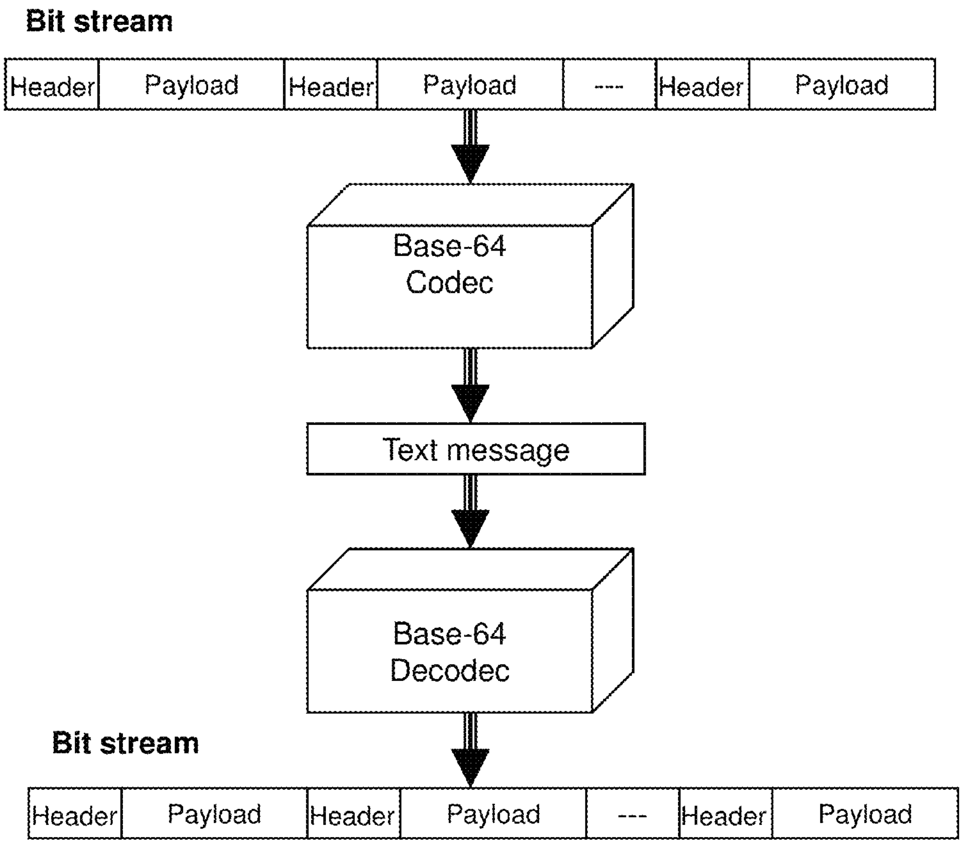
FIG. 3 diagrammatically shows an example of the sequence of operations implemented by the system to pool information into a bit stream transmitted by means of a single SMS.

Finally, a diagram is quoted in FIG. 3, which illustrates the sequence of operations for sending information pooled in a bit stream which may be sent in a single SMS.

The above-described container tracking system allows to advantageously optimize the power consumption required by the mobile units and thus allows to ensure the traceability of containers even in case of long lasting missions under penalizing environmental conditions for battery capacities, such as for example environmental conditions in which temperatures are very low.

Specifically, the mobile unit obtains a considerable reduction of power consumptions:

- by mainly remaining in the low activity state, in which the GPS global positioning module and the GSM telephone module are off;
- by reducing the SMS sending by the GSM communication module 10, by pooling the position messages according to the algorithm specified above and sending SMS's only in the presence of an event, such as for example an alarm or a time trigger calibrated by the remote control unit according to the tracking needs.

Thereby, switching on and using the GSM communication module 10, which is the most power-consuming component of mobile unit 3, is reduced to the essential, thus determining an evident advantage in terms of life of the supply batteries.

It is finally apparent that changes and variations may be made to the system here described and illustrated, without therefore departing from the scope of the present invention as defined by the accompanying claims.

We claim:

1. A container tracking system comprising a mobile unit configured to be coupled to a container to be tracked and to communicate with a ground control unit through a communication system; the mobile unit comprising positioning means, alarm means adapted to detect alarm conditions related to said container, and communication means adapted to generate a tracking signal containing position data of said mobile unit and, if present, alarm information associated with one or more alarm conditions related to said container;

said mobile unit being configured to evolve to a low activity state whenever a communication unavailability condition of said tracking signal through said communication system occurs; said low activity state providing for switching off said positioning means and said communication means of said mobile unit;

wherein said mobile unit is configured to remain in said low activity state for a predetermined wake-up time interval and is adapted to pass to an activation state, at the end of said wake-up time interval;

wherein said mobile unit is configured so as to switch from said activation state to a coverage detection state in which said mobile unit checks the communication availability or unavailability of the tracking signal through said communication system.

2. A system according to claim 1, wherein in said activation state, said mobile unit being adapted to switch on said positioning means and storing said position data.

3. A system according to claim 2, wherein said mobile unit is configured to pass from said low activity state to said activation state when said alarm means detect at least one container alarm condition; in said activation state, said mobile unit being adapted to store said alarm information.

4. A system according to claim 1, wherein said mobile unit is configured to generate a trigger at the end of said predetermined wake-up time interval and is adapted to count the number of generated triggers; said mobile unit being further configured so as to evolve from said activation state to said telephone coverage detection state when the number of triggers meets the predetermined relationship with a predetermined threshold.

5. A system according to claim 4, wherein said mobile unit is configured so as to evolve from said activation state to said low activity state when the number of counted triggers does not meet said predetermined relationship with said predetermined threshold.

6. A system according to claim 1, wherein said mobile unit is further configured so as to evolve from said coverage detection state to said low activity state when it detects a communication unavailability condition of said tracking signal through said communication system.

7. A system according to claim 6, wherein said mobile unit is configured to pass from said coverage detection state to a transmission state when it detects said communication availability condition of the tracking signal; in said transmission state, said mobile unit being configured so as to control the transmission of said tracking signal.

8. A system according to claim 7, wherein said mobile unit is configured so as to evolve from said transmission state to said activation state when it detects an alarm condition and/or receives a command signal transmitted by said ground control unit, within a predetermined waiting time interval.

9. A system according to claim 8, wherein said mobile unit is configured so as to evolve from said transmission state to said low activity state when it does not detect any alarm condition and does not receive any command signal transmitted by said ground control unit, within said waiting time interval.

10. A system according to claim 1, wherein said tracking signal generated by said mobile unit and said command signal generated by said ground control unit are SMS-type telephone signals.

11. A system according to claim 8, wherein said command signal transmitted by said ground control unit comprises either a calibration reconfiguration of said mobile unit; or a request for configuration values of said mobile unit; or a request for sending at least one tracking signal stored by said mobile unit.

12. A system according to claim 1, wherein said communication system comprises a mobile phone communication network and/or a satellite communication network.

13. A container tracking system comprising a mobile unit configured to be coupled to a container to be tracked and to communicate with a ground control unit through a communication system; the mobile unit comprising positioning means, alarm means adapted to detect alarm conditions related to said container, and communication means adapted to generate a tracking signal containing position data of said mobile unit and, if present, alarm information associated with one or more alarm conditions related to said container;

said mobile unit being configured to evolve to a low activity state whenever a communication unavailability condition of said tracking signal through said communication system occurs; said low activity state providing for switching off said positioning means and said communication means of said mobile unit, wherein said mobile unit is provided with an arming button, which is structured so as to be able to be pressed when mobile unit is coupled to said container, and to be released when said mobile unit is separated from the container itself; said mobile unit being configured so as to move to a confirmed arming state when said arming button remains pressed for a predetermined arming time interval; said arming state including the activation of said positioning and communication means.

14. A system according to claim 13, wherein said mobile unit is configured so as to evolve from said arming check state to said standby state, when said arming button is released before said predetermined arming time interval.

15. A mobile unit according to claim 1 for a container tracking system.

16. A computer product loaded on a memory of the mobile unit of claim 15 and configured so that, when it is run, the mobile unit operates according to claim 1.

17. A container tracking system comprising:

a mobile unit configured to couple to a container to be tracked and to communicate with a ground control unit through a communication system, the mobile unit comprising a satellite positioning module and a communication module for communicating with a phone network, said mobile unit being configured to change to a low activity state whenever the communication module is unable to communicate with the phone network; said low activity state providing for switching off said satellite positioning module and said communication module of said mobile unit;

wherein said mobile unit is configured to remain in said low activity state for a predetermined wake-up time interval and is adapted to pass to an activation state, at the end of said wake-up time interval and wherein said mobile unit is configured so as to switch from said activation state to a coverage detection state in which said mobile unit checks communication availability through said communication system.

18. The container tracking system of claim 17, wherein the mobile unit communicates position information obtained from the satellite positioning module using SMS messages.

* * * * *